(12) United States Patent
Ichnowski (10) Patent No.: US 8,438,649 B2
(45) Date of Patent: May 7, 2013

(54) STREAMING INSERTION OF TOKENS INTO CONTENT TO PROTECT AGAINST CSRF

(75) Inventor: Jeffrey Ichnowski, San Mateo, CA (US)

(73) Assignee: Success Factors, Inc., San Mateo, CA (US)

(*) Notice: Subject to any disclaimer, the term of this patent is extended or adjusted under 35 U.S.C. 154(b) by 440 days.

(21) Appl. No.: 12/761,965

(22) Filed: Apr. 16, 2010

(65) Prior Publication Data

US 2011/0258704 A1     Oct. 20, 2011

(51) Int. Cl.
*H04L 9/00* (2006.01)

(52) U.S. Cl.
USPC .......................................................... 726/26

(58) Field of Classification Search ............. 726/26
See application file for complete search history.

(56) References Cited

U.S. PATENT DOCUMENTS

| | | | | |
|---|---|---|---|---|
| 7,500,099 | B1* | 3/2009 | McElwee et al. | 713/168 |
| 2008/0083032 | A1 | 4/2008 | Yamaoka | |
| 2008/0115201 | A1* | 5/2008 | Sturms et al. | 726/9 |
| 2008/0222736 | A1* | 9/2008 | Boodaei et al. | 726/27 |
| 2008/0320567 | A1 | 12/2008 | Shulman et al. | |
| 2009/0125977 | A1 | 5/2009 | Chander et al. | |
| 2009/0222923 | A1* | 9/2009 | Dixon | 726/24 |
| 2011/0154473 | A1* | 6/2011 | Anderson et al. | 726/11 |

OTHER PUBLICATIONS

Jovanovic et al, "Preventing Cross Site Request Forgery Attacks", 2006, IEEE, pp. 1-10.*
International Search Report for PCT/US2011/029792 dated Nov. 25, 2011.

* cited by examiner

*Primary Examiner* — Matthew Smithers
(74) *Attorney, Agent, or Firm* — Patterson & Sheridan LLP (57) ABSTRACT

Methods and apparatus are provided for protecting against cross-site request forgeries (CSRFs) by requiring certain requests submitted to a computer server to include specific tokens. The requests involve modification of or access to protected data, and the tokens are inserted by a state machine into content from which the requests are initiated. For example, content that includes a form, a hyperlink, a scripted request or other control for initiating a follow-on request to the server is modified to include tokens. The state machine may scan the content in real time (e.g., as it is served) to identify these controls and to insert the tokens. Using a state machine allows the content to be streamed even as it is scanned, does not require construction of a representation of the content (e.g., a DOM tree), and avoids modifying any of the content other than to insert one or more tokens.

20 Claims, 6 Drawing Sheets

STREAMING INSERTION OF TOKENS INTO CONTENT TO PROTECT AGAINST CSRF

BACKGROUND

This invention relates to the fields of computer systems and computer security. More particularly, methods and apparatus are provided for protecting against CSRF (Cross-Site Request Forgeries) by processing a stream of content as it is served and inserting special tokens, and examining a follow-on data request to ensure it possesses a token.

A cross-site request forgery is a type of computer attack in which an illegitimate data or application request is accepted at a targeted website or application because it contains a valid session cookie. Typically, the perpetrator of the attack tricks an authorized user—the user to whom the valid cookie was issued—into activating a reference (e.g., a hyperlink) at a site other than the target site, such as at a site operated by the perpetrator, and that reference generates the request. In accordance with normal HTTP (Hyper Text Transport Protocol) processing, the authorized user's browser will automatically add the cookie to the request when it is submitted to the target site.

A CSRF may therefore allow a malicious actor to modify data they otherwise could not modify, or to perform some action that ordinarily they could not (e.g., create a user account, change a password). For example, the valid user may be authorized to access private or privileged information, such as personnel records, social security numbers and so on. By hijacking the valid user's session cookie, the perpetrator of the CSRF may be able to manipulate such information.

Traditionally, a website is protected against CSRFs by requiring an additional hidden set of data (beyond just a session cookie) in order to accept a content request as legitimate. For example, the additional data may be generated as part of a web form, an HTML link, an HTTP header, a scripted request or other set of content that can be manipulated to initiate a new request.

When the user's browser receives and acts on the content to initiate a request (e.g., by filling out a form, by activating a link), the request is accepted only if it contains the data that was embedded in the content. Because a third party (e.g., an initiator of a CSRF attack) would not receive the hidden data, and the browser does not automatically include it (like a cookie), it could not create a properly formatted request, and thus the target site would reject the third party's request.

However, for this form of CSRF protection to work, the hidden data must be injected into every interface or control that provides access to content that is to be protected. Templates for dynamically generating the interfaces could be manually modified to insert the data, but then the additional data may be static (instead of differing for different requests) and could become known, in which case this security feature could be compromised.

Instead, the additional data may be added by parsing each relevant web document (e.g., each HTML document that provides access to protected content) as it is generated by a server, storing a representation of the web document in memory (e.g., as a DOM or Document Object Model tree), traversing that representation, modifying the document's structure to include the additional data, and then generating new HTML code to be served to the requester.

Reconstructing and modifying the document after it has been served, but before it can be delivered to a destination user, necessarily entails delay and inefficiency. In particular, this attempted solution requires additional processing for every page of HTML, to construct a DOM or other model, to parse it to identify a location at which to insert the data, and to assemble a new HTML page to be served. The consumption of processor time and the use of memory to store the document model, which occurs every time a user requests access to protected content, may have a negative effect on a server's performance and a user's experience. The content is likely to be delayed in getting to the user because it cannot be forwarded until the parser has reconstructed the entire document.

In addition, the parsing process is likely to alter the HTML in ways other than simply adding the additional data. For example, parsing and reconstruction of the HTML code may reduce (or increase) whitespace, change a font or font size, change case (e.g., uppercase to lowercase or vice versa) and/or make other alterations. Even a subtle change in the HTML may cause an application that operates on the code to act differently or to present the HTML differently to a user.

In addition, an HTML parser (or a parser that operates on other markup language) expects to receive well-formed code, and may not be able to handle code that contains even a minor error. An error in a page of HTML content may cause the parser to operate incorrectly or to fail to operate on the content, thereby preventing a user from receiving the content or from initiating a follow-on request (e.g., because the additional data could not be inserted as required).

Thus, this method of protecting against a CSRF may cause changes in a legitimate user's experience, or may even cause content to be presented incorrectly or not be presented at all.

SUMMARY

In some embodiments of the invention, methods and apparatus are provided for protecting against cross-site request forgeries (CSRFs), by requiring certain requests submitted to a computer server to include specific tokens.

In these embodiments, the requests involve modification of or access to protected data, and the required tokens are inserted into content from which the requests are initiated. For example, content that includes a form, a hyperlink, a scripted request or other control for initiating a follow-on request to the server may be modified to include tokens for each control that may cause a follow-on request.

In embodiments of the invention presented herein, a state machine is employed to scan the content in real time (e.g., as it is served) to identify these controls and to insert the tokens. In some other embodiments, the content may be scanned and tokenized before it is served.

Using a state machine, which allows the content to be streamed even while it is scanned, does not a representation of the content to be constructed (e.g., a DOM tree), in order to find locations where tokens should be inserted, and avoids modifying any of the content other than to insert one or more tokens. In addition, the state machine can scan bad content (e.g., malformed HTML code) without aborting the scanning process.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, methods and apparatus are provided for protecting against CSRFs (Cross-Site Request Forgeries), with minimal overhead and without altering served content, other than to insert a CSRF token. A CSRF token comprises data that is extraneous to the content in which it is inserted (e.g., an HTML or Hyper Text Markup Language document). An incoming request that is originated from a form, link or other control or interface within the content may be rejected if it should, but does not, include a valid CSRF token.

In these embodiments, a CSRF token is inserted by a state machine configured to efficiently identify portions of a web document (or other content) that merit a token, without delaying delivery of the document to a user. The state machine need not generate an intermediate representation of the document, but instead can stream the content even as it scans the document and inserts tokens as warranted. Further, the state machine can handle code that is malformed, by transitioning to a safe state until a well-formed portion of code is again encountered, again without delaying the corresponding content from being delivered.

In these embodiments, a CSRF token may be structured as a form parameter, a URL (Uniform Resource Locator), a header or other parameter or attribute. The CSRF token differs from a cookie in that it is not automatically submitted by a user's browser whenever the browser communicates with the site that provided the token. Instead, it is only returned to an originating site or application when certain interactive content that comprises the token is activated.

More specifically, CSRF tokens are inserted into served content for some or all forms, links, scripted requests and/or other controls, within the content, that can be used by a browser (or other consumer of the content) to initiate a new or follow-on request to the site or application that served the content.

Figure 1:
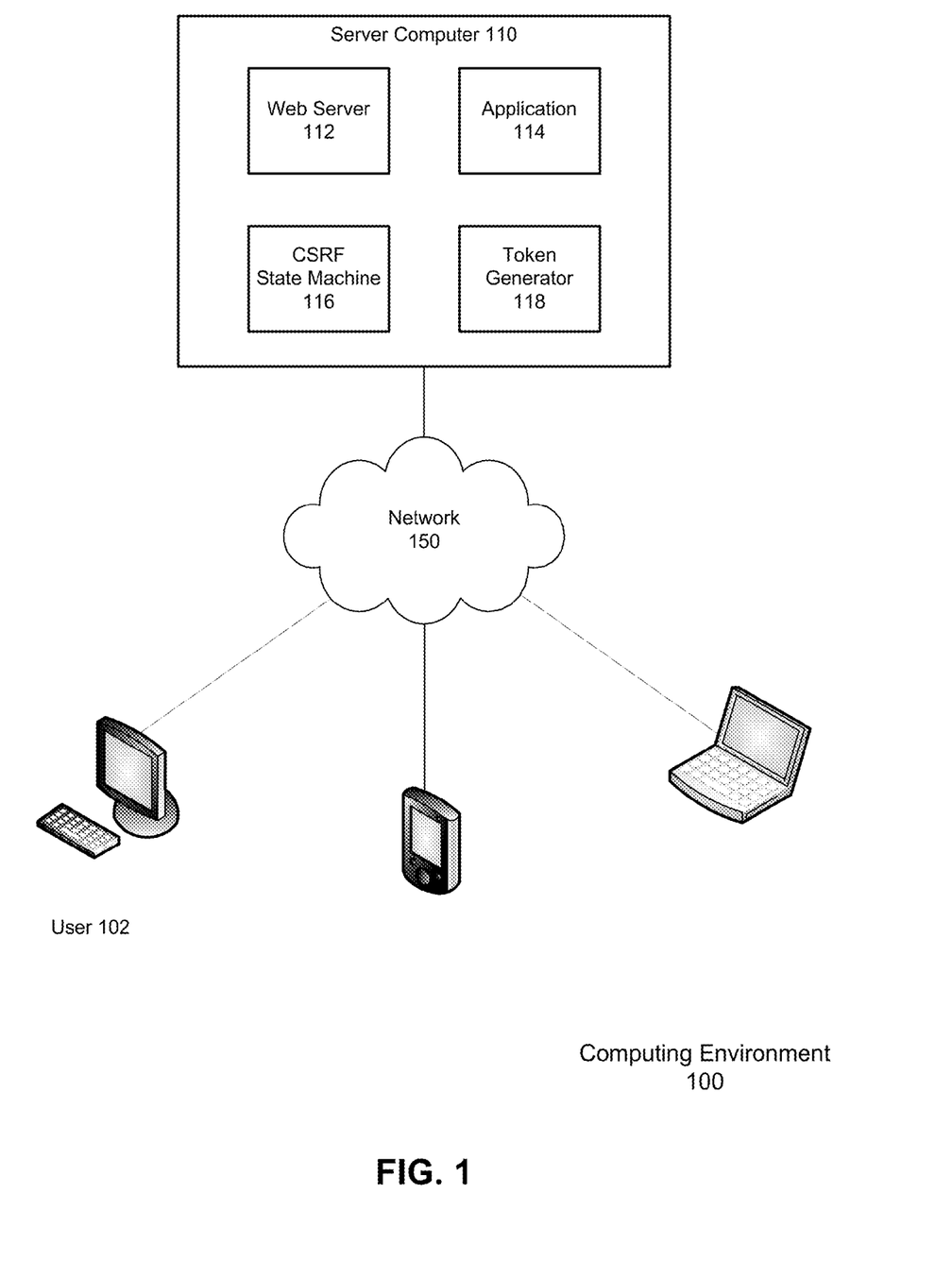
FIG. 1 is a block diagram depicting a computing environment in which an embodiment of the present invention may be implemented.

FIG. 1 is a block diagram of a computing environment in which some embodiments of the invention may be implemented.

In environment 100, users operate computing devices such as computer system 102 to access network 150, which may comprise the Internet and/or another public or private network (e.g., an intranet). Server computer 110 is operated by an organization to provide access to electronic content stored within the server computer or within a component coupled to the server computer (e.g., a storage array, a data server).

Server 110 comprises web server 112, application 114, CSRF state machine 116 and CSRF token generator 118. Other components of server computer 110 (e.g., processor, storage, display, input device) are omitted from FIG. 1 in the interest of clarity. In other embodiments of the invention, server 110 may comprise fewer or additional components. For example, two or more of components 112-118 may be merged or combined, or may be divided into additional components.

Some or all of components 112-118 may comprise computer programs or other sets of executable code that, when executed, perform functions described herein. In some embodiments of the invention, one or more of the components may comprise firmware or hardware elements.

Web server 112 is configured to receive requests from users, via network 150, and to respond to some or all requests with desired data, forms, scripts, images, applets and/or other content. The web server may thus be responsible for establishing and maintaining client communication connections, and may perform such tasks as supplying cookies to users' browsers, encrypting/decrypting communications, authenticating a user, etc.

Application 114 comprises an application program that interacts with a user to provide content (e.g., directly or via web server 112), manage data (e.g., such as a database) or provide other functionality. While application 114 and web server 112 may be combined in some embodiments of the invention, in environment 100 they are separate. Thus, access to application 114 may be managed by web server 112, and the web server may serve to users content generated or provided by application 114.

CSRF (Cross-Site Request Forgery) state machine 116 is configured to examine content served from (or to be served from) server computer 110 (by web server 112 and/or other components) to determine whether and when to insert a CSRF token that will be used to prevent cross-site request forgeries. As described in more detail below, CSRF state machine 116 may screen for content that can be manipulated by a user to submit a request to server computer 110 or to another computer system associated with server 110 (e.g., another server providing access to the same content).

Token generator 118 is configured to generate a CSRF token for insertion into a content item or stream of content. CSRF tokens may be generated dynamically as needed, and/or may be pre-generated. A CSRF token may comprise a random or semi-random sequence of data and/or a predetermined sequence, and may be unique among all CSRF tokens produced by server 110, or may be unique to a particular user, user session, application, content item or other context.

In a basic mode of operation, when server computer 110 serves an item of content (e.g., a web page, a form), CSRF state machine 116 scans the content to identify tags, attributes and/or other elements that can be manipulated to send a new request back to the server. In some embodiments, content may be scanned before it is selected to be served. When such an element is found, a CSRF token is inserted (if not already inserted) and the content is otherwise served normally.

If an element having a CSRF token is manipulated by a user (through his/her browser) to issue a request to server computer 110, the CSRF token will be sent with the request. The server scans the request to ensure it includes the correct CSRF token, may reject a request that does not include a valid token, and thereby blocks CSRFs. Scanning for CSRF tokens may be performed by web server 112, application 114 or some other component not illustrated in FIG. 1.

Because content is scanned by a state machine, as opposed to a parser for example, the state machine need not understand the language of the content on a semantic level. In particular, a parser must understand the syntax as well as the lexicon of the language in which the content is expressed (e.g., HTML, XML), and must reconstruct the content (e.g., as a Document Object Model or DOM tree) in order to examine it and determine how and where to insert a token. State machine 116, however, can simply scan the content (e.g., character-by-character) to locate specific identifiers (e.g., of forms, hyperlinks, images, other tags), without understanding the syntax of the language and without reconstructing the content.

Therefore, the state machine can allow the content to continue to be streamed to a target user; a parser, on the other hand, would necessarily cause additional latency as it modeled or constructed the content, searched it for relevant elements and then reconstructed the content code with a token and forwarded it to a user. In addition, the only modification to the content made by a state machine is the insertion of a CSRF token, whereas a parser may alter the whitespace, font, case and/or other characteristics of the content's code.

An illustrative, but not necessarily complete, list of tags that a state machine may be configured to search for include the following: "form", "input", "a" (for a link), "area", "base", "img", "style", "script", "link", "embed", "object", "frame", "iframe" and so on. In general, the state machine may search for any tag that may be part of, or that may initiate, a request to the server. One of ordinary skill in the art would recognize tags and attributes that, when rendered in a user's browser, allow the browser to initiate a request.

As one example of how a URL within a set of content may be modified, consider the following stream of code referencing a URL having label "label":

```
<a href='/action?param1=value1'> label
</a>
```

CSRF state machine 116 of FIG. 1 may detect the URL and transform it into something like:

```
<a href='/action?param1=value1&CSRFTOKEN=SECRET'> label
</a>
```

As another example, the state machine may insert a CSRF token into the following form parameter:

```
<form action="/process">
<input type="text" name="param1"> ...
</form>
```

To produce a modified parameter such as:

```
<form action="/process>
<input type="hidden" name="CSRFTOKEN" value="SECRET">
```

-continued

```
<input type="text" name="param1"> ...
</form>
```

In both of the preceding examples, a CSRF token having the value "SECRET" was injected into a stream of content. In general, either or both HTML attributes and HTML methods may be inserted or modified by the state machine.

The form or content of a CSRF token may vary over time so that adequate protection is provided even if the token propagates beyond an immediate recipient. For example, a CSRF token embedded in a link may propagate via "referrer leakage." By regularly changing a token associated with a particular set of content (or with a particular user or other factor), or by generating the token from a hash code or other set of dynamic data, a "leaked" token can be rendered invalid before it can ever be exploited.

Figure 2:
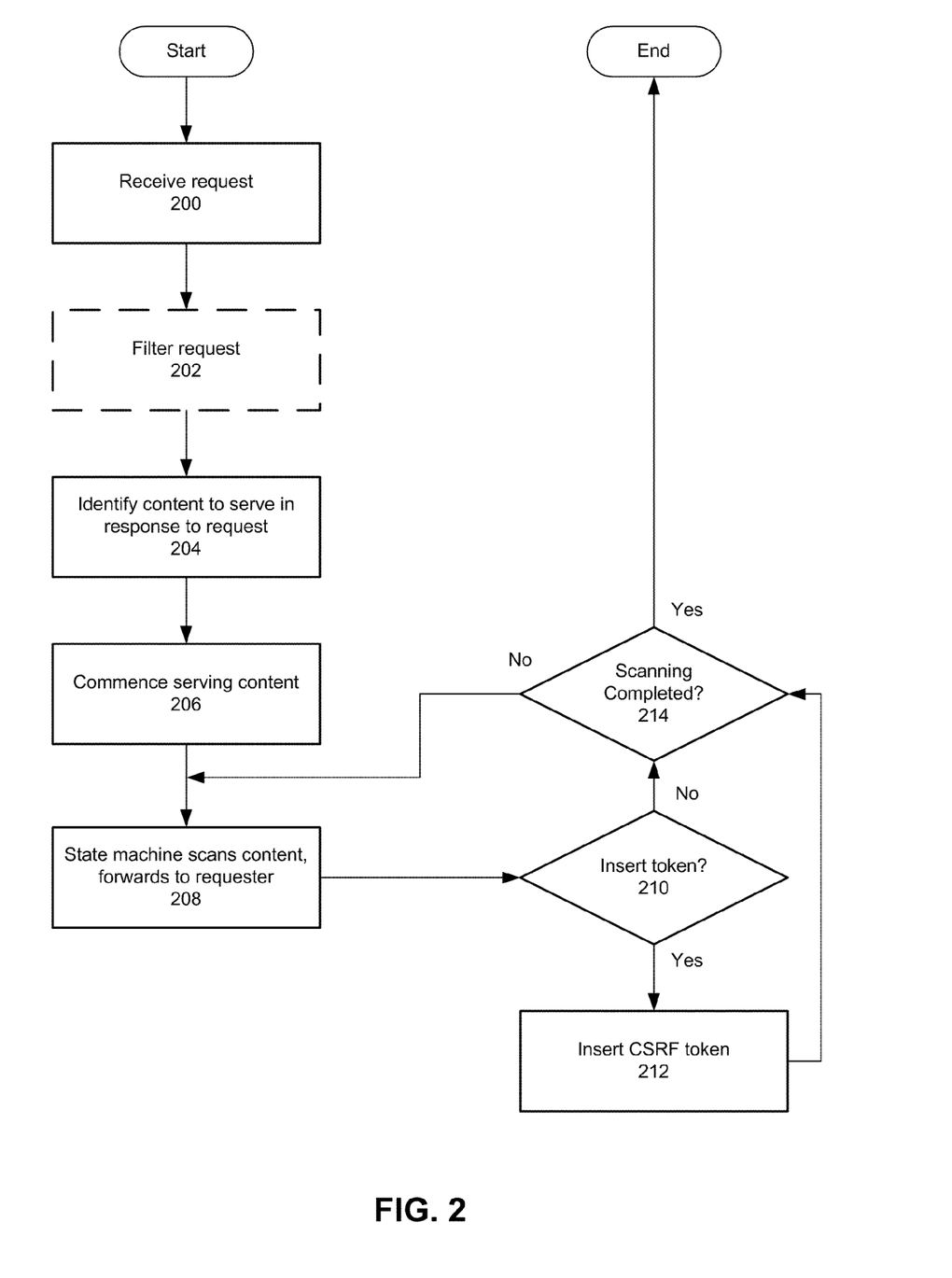
FIG. 2 is a flow chart demonstrating a method of inserting a CSRF token within appropriate content, at one or more suitable locations, according to some embodiments of the invention.

FIG. 2 is a flow chart demonstrating a method of inserting a CSRF token within appropriate content, at one or more suitable locations, according to some embodiments of the invention.

In operation 200, a request for content is received at a computer server, a web server, a database server or other computer system configured to serve content electronically via a network, particularly the Internet. The request may be received via HTTP (Hypertext Transport Protocol) or any other suitable protocol.

The request may be received from an authenticated user (e.g., after he or she logs in). If a cookie is received with the request, the request may be assumed to have been issued by the user/browser associated with the cookie.

In optional operation 202, the request is filtered by source address/port, destination address/port, originating user, request type, protocol, target application or content, or any other parameter. Thus, a method of using a CSRF token to resist cross-site request forgeries may only be applied to a subset of communication traffic received at the computer system.

In operation 204, a set of content expressed in any suitable language or technology (e.g., HTML, XML, XHTML, Ajax) is selected or identified to be served in response to the request.

In operation 206, the computer system begins to serve the content.

In operation 208, as the content is served, it is scanned by a CSRF state machine (e.g., state machine 116 of FIG. 1). In some embodiments of the invention, the state machine scans the content (i.e., the HTML code or other code that will be consumed by a browser or other application to present the desired content to a user) character-by-character to identify lexical patterns indicative of a content element that can be manipulated (e.g., clicked on in a browser, filled out in a form) to issue a subsequent request to the computer server.

As indicated above, the state machine may search for specific text corresponding to a particular form, tag, hyperlink or other element, string or block of code. The state machine only needs to identify specific character patterns, and does not need to understand the semantics and syntax of the language in which the content is encoded, and therefore does not need to recreate or reconstruct the content in order to do so.

As the state machine scans the content, it is forwarded to the requester. In some embodiments, the state machine may temporarily buffer some tags, attributes and/or other elements of the content. Illustratively, when the state machine finds a content element that requires a CSRF token, the token may be selected or generated based on the context indicated by the buffered information. Alternatively, some or all CSRF tokens may be predetermined; a given token may match another token or may be unique.

In operation 210, if the state machine identifies a type of element that requires a token, the method continues with operation 212; otherwise, the method advances to operation 24.

In operation 212, the state machine inserts a CSRF token as part of a tag or block that a user's browser may act upon to issue a follow-on or subsequent request. The composition of the token that is inserted may be determined based on data gleaned from the content during scanning, the content itself or the type of content, the communication session in which the content is being served, and/or other factors.

Because it is inserted within the tag, the token will be automatically returned to the computer server if the follow-on request is issued. After operation 212, the method continues with operation 214.

In operation 214, it is determined whether scanning of the content has completed. If scanning (and serving of the content) is complete, the method ends. Otherwise, the method returns to operation 208 to continue scanning.

Because the state machine merely scans the content and inserts one or more CSRF tokens, as needed, it does not change any character, text or whitespace within the content, and the browser that receives the content will thus present it exactly the same as it would have if the state machine had not operated on the content.

In some embodiments of the invention in which a state machine scans and adds tokens in real time, input to the state machine may be filtered to avoid scanning content that includes no form tags, link tags or other controls that can be manipulated to initiate another request.

Figure 3:
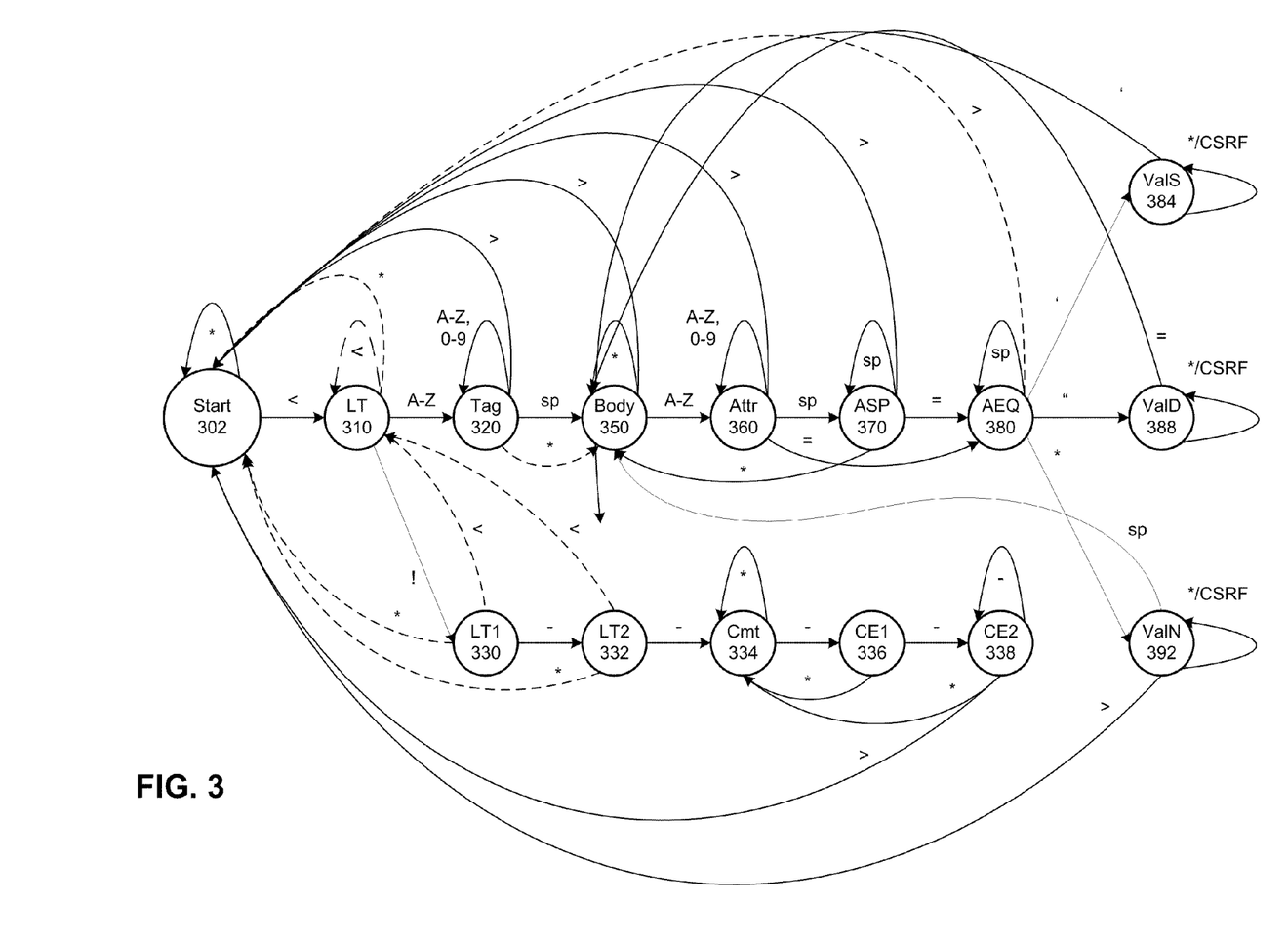
FIG. 3 is a diagram depicting operation of a state machine for scanning a set of content and inserting a CSRF token if/as needed, according to one embodiment of the invention.

FIG. 3 diagrams operation of a state machine for scanning a set of content and inserting a CSRF token if/as needed, according to one embodiment of the invention. As one of ordinary skill in the art will appreciate, the state machine depicted in FIG. 3 is illustrative only, and may be readily modified to insert CSRF tokens using more or fewer states.

In FIG. 3, the state machine commences scanning a set of content at the beginning of the content, and cycles within Start state 302 unless and until it encounters the symbol "<", at which time the state machine transitions to LT ("less than") state 310. Throughout FIG. 3, the "*" symbol is used to mark a path that is followed from a given state as long as the most recently seen character of the content does not match any other paths from that state.

In addition to using "*" to indicate "any other character", "sp" indicates a whitespace character (e.g., space, tab, new line, return), "A-Z" indicates any alphabetical character, "0-9" indicates any numeric character, and other individual characters represent themselves (e.g., "<", ">", "!", "–"). The label "*/CSRF" indicates that a determination is made as to whether a CSRF token is warranted or required and, if so, to insert it in the stream of content. Dashed lines indicate error-recovery state transitions LT state 310 corresponds to the discovery of a "less than" symbol (i.e., "<"). Tag state 320 corresponds to discovery of a tag consisting of alphanumerical characters. Body state 350 corresponds to the body of a tag, while Attr (attribute) state 360 corresponds to an attribute. ASP state 370 corresponds to the space following an attribute name, while AEQ state 380 corresponds to the equal sign following that space. For each attribute, a different value state (i.e., ValS state 384, ValD state 388, ValN state 392) corresponds to a different type of quotation character surrounding the value (i.e., single quotation mark or apostrophe, double quotation mark, no quotation mark).

LT1 state 330 and LT2 state 332 indicate that the start of a comment has been encountered, which may be followed by a comment at Cmt (comment) state 334. CE1 state 336 and CE2 state 338 correspond to the end of a comment.

Not all paths and/or states are necessarily shown in FIG. 3. In addition, within some states (e.g., Tag state 320, Attr state 360, Val states 384, 388, 392), the state machine or cooperating logic may buffer a tag name, an attribute name, an attribute value and/or other data from the content stream. As described previously, when it is subsequently determined that a CSRF token should be inserted, the buffered data may be used to choose, generate or configure an appropriate token.

Figure 4:
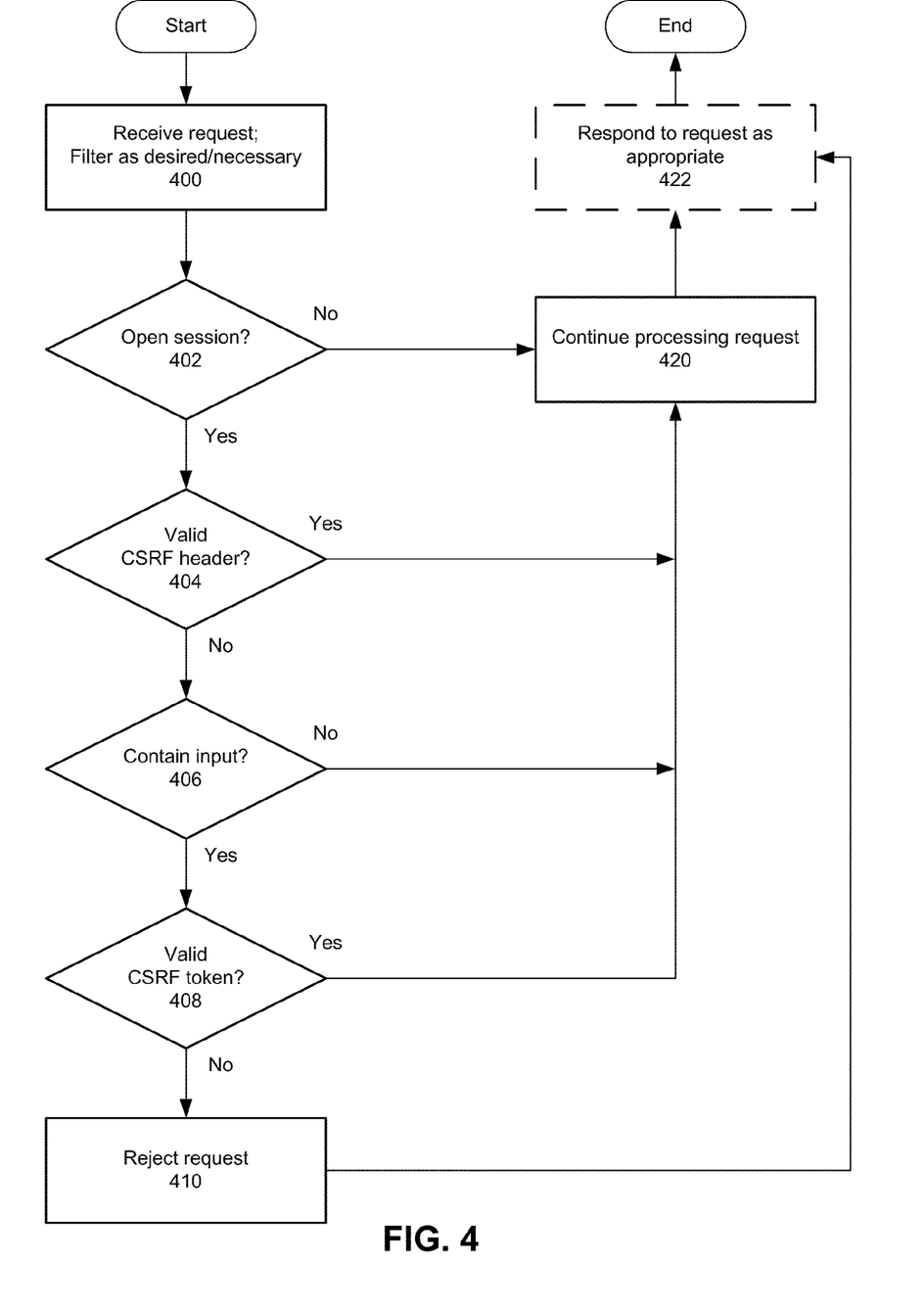
FIG. 4 is a flow chart demonstrating a method of preventing cross-site request forgeries by requiring certain requests to include CSRF tokens, according to some embodiments of the invention.

FIG. 4 is a flow chart demonstrating a method of preventing cross-site request forgeries by requiring certain requests to include CSRF tokens, according to some embodiments of the invention. In these embodiments, the CSRF token may only be required in a request for content that encompasses an interface or other control for sending input or a follow-on request. For example, a request for a form that may be populated with a browser and then submitted may be required to have a CSRF token, while a request for static content (e.g., a textual news story) may not.

In operation 400, a request is received at a computer server, a web server, a database server or other computer system configured to serve content electronically via a network, particularly the Internet. The request may be received via HTTP (Hypertext Transport Protocol) or any other suitable protocol.

Also in operation 400, the request may be filtered by source address/port, destination address/port, user, request type, protocol, or any other parameter or aspect of the request. In particular, the described method of using a CSRF token to resist cross-site request forgeries may only be applied to a subset of communication traffic received at the computer system.

In operation 402, the computer system determines whether the user or browser from which the request was received currently has an open session with the computer. For example, if the request includes a cookie, the system may examine the cookie to determine if it relates to a valid communication session. If an open session does not exist, then the request cannot be one that is required to possess a valid CSRF token, and the method advances to operation 420.

In optional operation 404, the computer system may determine whether the request includes a valid CSRF header. In some embodiments of the invention, such as one in which the request corresponds to an application developed with Ajax (Asynchronous JavaScript and XML) technology, the request may be required to possess a special header.

In the illustrated embodiment of the invention, an Ajax application may be configured with a method of protecting against CSRFs that involves insertion of a CSRF header into the request by a client-side script or program module. If the request possesses this special header, this indicates the request was made by a legitimate client-side script, and the method advances to operation 420.

In operation 406, the computer system determines whether the request includes any form parameters or other input that may or will be used to execute or respond to the request. If not, then normal processing of the request may not cause any protected data to be served or altered, and so the request is not one that requires a CSRF token, and the method advances to operation 420.

In some alternative embodiments of the invention, operation 406 may be omitted. In particular, operation 406 reflects a computing environment in which modification of data on the computer system can only be done through requests that include form parameters or other input. If data can be modified without input, such as where the target of the request or the form from which the request was initiated is enough to cause the modification, then operation 406 may be omitted or altered to identify requests that must be checked for CSRF tokens.

In operation 408, the request has been identified as one that requires a CSRF token, and so the computer system determines whether the request possesses the required token—i.e., the token that was served with the content (e.g., the form, the web page) from which the request was issued. If the request includes the token, then it is likely a valid request and the method advances to operation 420.

If the required CSRF token is missing from the request, different actions may be taken in operation 410 in different embodiments of the invention. For example, an open communication session with the user/browser that submitted the request may be terminated, the request may be simply dropped or aborted, an error message may be returned to the issuer of the request, a process for authenticating the user may be initiated, etc. After operation 410, the illustrated method may terminate or may advance to operation 422.

In operation 420, the request is processed. The processing that is applied may depend upon how this operation was reached. For example, if the method proceeded from operation 402, then processing the request may involve initiating a user authentication procedure (e.g., a login dialog). If coming from operation 406 or operation 408, operation 420 may involve taking whatever action is encompassed by the request, such as to identify content to be served, altering stored data (e.g., a database), etc.

In operation 422, the computer system responds appropriately to the request, as needed. This may involve serving content, redirecting the user's browser to another site, terminating the user's connection, etc.

In some alternative embodiments of the invention, other mechanisms may be applied to protect against CSRFs, in addition to or instead of mechanisms described herein. For example, specific applications (e.g., Ajax) or clients (e.g., Flash, Java, Silverlight) may incorporate special protection. Embodiments of the invention presented herein may be modified accordingly to cooperate with such protection mechanisms.

Figure 5:
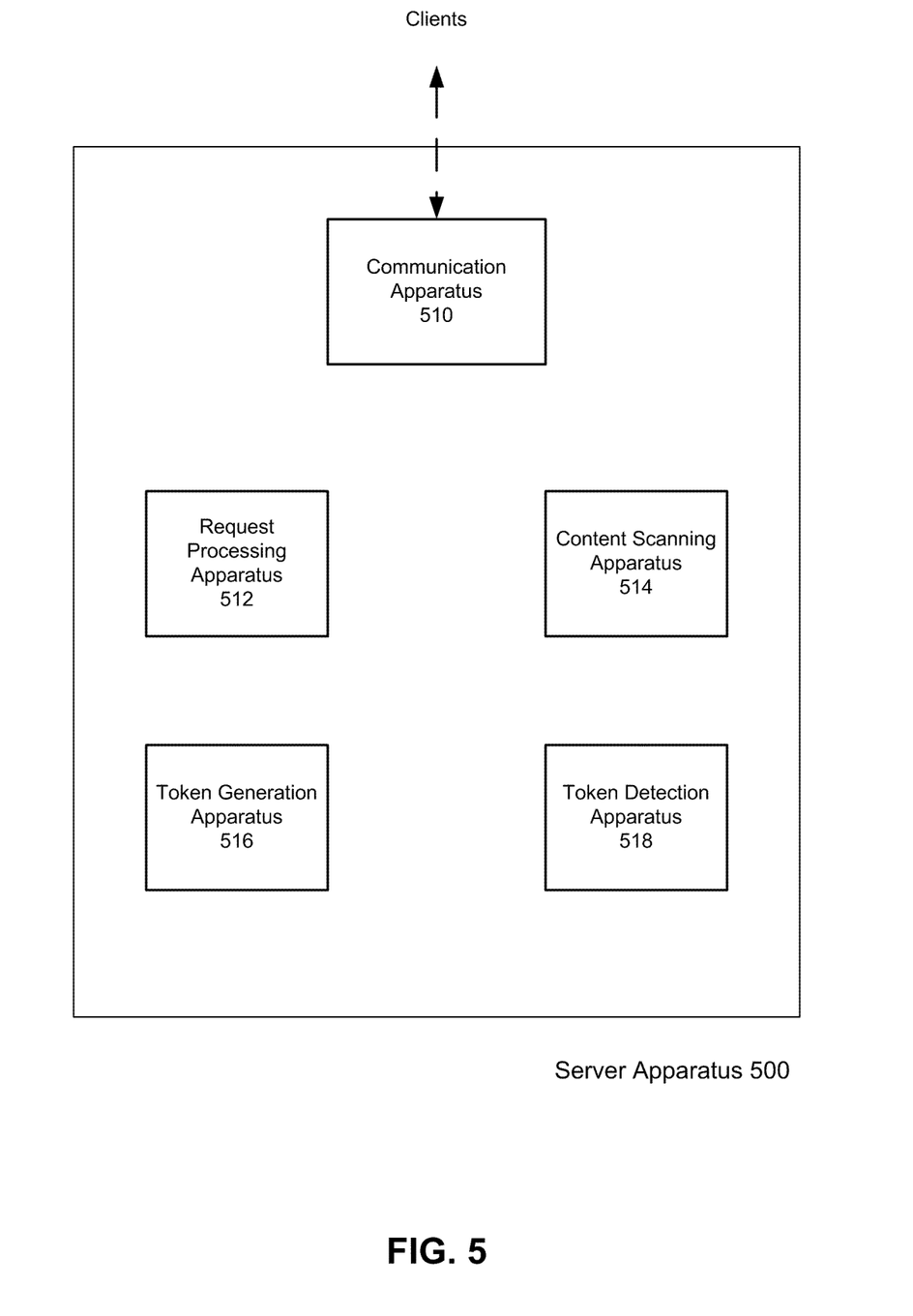
FIG. 5 is a block diagram of hardware apparatus for using CSRF tokens to combat cross-site request forgeries, according to some embodiments of the invention.

FIG. 5 is a block diagram of hardware apparatus for using CSRF tokens to combat cross-site request forgeries, according to some embodiments of the invention.

Computer server apparatus 500 of FIG. 5 comprises communication apparatus 510, processing apparatus 512, content scanning apparatus 514, token generation apparatus 516 and token detection apparatus 518. Any or all of these apparatuses may be combined in other embodiments of the invention.

Communication apparatus 510 is adapted to receive requests for content and serve responses to the requests. Upon receipt, such requests may be directed or reported to processing apparatus 512, token detection apparatus 518 and/or some other apparatus. In addition to receiving requests and serving responses to such requests, communication apparatus 512 may also perform other tasks associated with a communication connection, such as user authentication or verification, encryption/decryption, etc. In some implementations, communication apparatus 510 comprises a web server or database server.

Processing apparatus 512 is adapted to process content requests, identify or select content to be served, prepare the content for serving, manipulate data and/or program code and so on. In some implementations, apparatus 512 comprises a central processing unit and/or program code executable by a central processing unit to perform functions described herein.

Content scanning apparatus 514 is adapted to scan content before or while it is served in response to a request. In some embodiments of the invention, apparatus 514 comprises a state machine configured to scan the content to identify tags, blocks or other program elements that, when rendered by a browser or other consumer of the content, can be used to issued another request to the server apparatus. Upon recognition of such an element, content scanning apparatus 514 inserts a CSRF token into the content as part of, or in proximity to, the element.

Token generation apparatus 516 is adapted to generate a CSRF token. A token may comprise random or semi-random data, may be unique among all tokens or some subset of tokens segregated by time, user, application, program element with which the token is associated, etc., and is preferably generated in a secure manner so as to frustrate any potential attackers' attempts to obtain a token. A token may be generated in real time, as needed, or may be generated beforehand and stored.

Token detection apparatus 518 is adapted to search for and detect a CSRF token in some or all requests received at the communication device. A request for which a CSRF token is required (e.g., a request that includes input or that accesses protected data) may be dropped, cancelled or rejected if it does not include a valid token. In some embodiments of the invention, token detection apparatus 518 may be implemented as part of communication apparatus 512 or processing apparatus 514.

Figure 6:
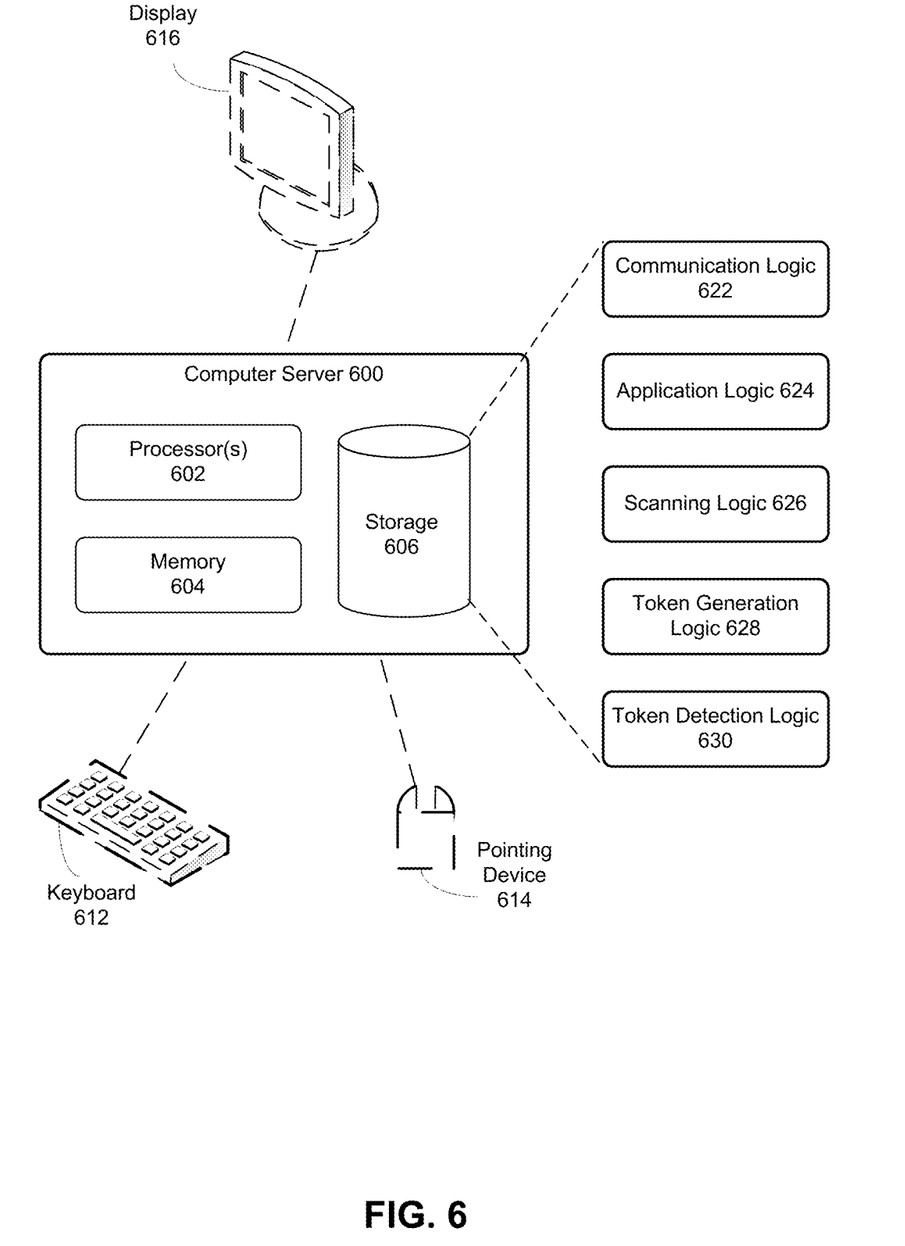
FIG. 6 is a block diagram of a computer server that may be configured to prevent cross-site request forgeries through the use of CSRF tokens, according to some embodiments of the invention.

FIG. 6 is a block diagram of a computer server that may be configured to prevent cross-site request forgeries through the use of CSRF tokens, according to some embodiments of the invention.

Computer server 600 of FIG. 6 comprises processor 602, memory 604 and storage 606, which may comprise one or more optical and/or magnetic storage components. Communication device 600 may be coupled (permanently or transiently) to keyboard 612, pointing device 614 and display 616.

Storage 606 of the communication device stores logic that may be loaded into memory 604 for execution by processor 602. Such logic includes communication logic 622, application logic 624, scanning logic 626, token generation logic 628 and token detection logic 630.

Communication logic 622 comprises processor-executable instructions for receiving requests (e.g., for content, for data) and for responding to such requests. Logic 622 may therefore comprise logic associated with a web server, a data server or other code for establishing and maintaining communication connections.

Application logic 624 comprises processor-executable instructions for processing content and/or other information on computer server 600. The application logic may assist in the operation of an organization (e.g., as a human resources or resource management application), may provide entertainment (e.g., as a social networking or game application), or may provide some other service or services that include providing content.

Scanning logic 626 comprises processor-executable instructions for scanning content served from (or to be served from) computer server 600. For this purpose, logic 626 comprises a state machine configured to scan the content for tags, codes or other identifiers, and insert appropriate CSRF tokens in association with such identifiers.

Token generation logic 628 comprises processor-executable instructions for generating a CSRF token. The token may be generated randomly, or may be generated based on the content in which the token is inserted, the user who requested the content, or some other factor(s).

Token detection logic 630 comprises processor-executable instructions for detecting a CSRF token in a request received at computer server 600. Logic 630 may therefore operate to ensure that certain requests (e.g., requests that change data or that access protected data) include valid CSRF tokens, so as to prevent CSRFs.

In some embodiments of the invention, some or all of logic 620-630 may be combined or further divided.

The environment in which a present embodiment of the invention is executed may incorporate a general-purpose computer or a special-purpose device. Details of such devices (e.g., processor, memory, data storage, display) may be omitted from descriptions herein for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of adding tokens to content to protect against a cross-site request forgery, the method comprising:
receiving a request for a page of content;
prior to transmitting the page of content to a destination, initiating a state machine to an initial state;
scanning, by the state machine, the page of content character by character for predetermined tags, without constructing a model of the page of content, wherein the scanning includes transitioning a state of the state machine based on the character-by-character content of the page of content until reaching a state indicating that one of the predetermined tags has been encountered;
while scanning the page of content, identifying a malformed portion of the page of content and transitioning the state of the state machine to a safe state until encountering a well-formed portion of the page of content;
commencing transmission of the page of content to a destination before completion of said scanning; and
for each predetermined tag located in the page of content, inserting a token into the page of content while transmitting the page of content.

2. The method of claim 1, wherein said receiving comprises receiving the page of content as it is served toward the destination.

3. The method of claim 1, wherein said receiving comprises receiving multiple pages of content, including the page of content, before they are served.

4. The method of claim 1, wherein said commencing transmission of the page of content comprises serving each character of the page of content after it is scanned.

5. The method of claim 1, wherein a first predetermined tag is associated with a form parameter.

6. The method of claim 1, wherein a first predetermined tag is associated with a form attribute.

7. The method of claim 1, wherein a first predetermined tag is associated with a link.

8. The method of claim 1, further comprising:
receiving a request initiated from the page of content;
determining whether the request comprises a first token inserted in the page of content; and
if the request does not comprise the first token, rejecting the request.

9. The method of claim 8, further comprising, if the request does not comprise the first token:
Terminating a communication session in which the request was received.

10. A non-transitory computer-readable storage medium storing instructions that, when executed by a computer, cause the computer to perform a method of adding tokens to content to protect against a cross-site request forgery, the method comprising:
receiving a request for a page of content; prior to transmitting the page of content to a destination, initiating a state machine to an initial state; scanning, by the state machine, the page of content character by character for predetermined tags, without constructing a model of the requested page of content wherein the scanning includes transitioning a state of the state machine based on the character-by-character content of the page until reaching a state indicating that one of the predetermined tags has been encountered; while scanning the requested page of content, identifying a malformed portion of the requested content and transitioning the state of the state machine to a safe state until encountering a well-formed portion of the page of content; commencing transmission of the page of content to a destination before completion of said scanning; and for each predetermined tag located in the requested page of content, inserting a token into the page of content while transmitting the page of content.

11. An apparatus configured to serve content while protecting against cross-site request forgeries, the apparatus comprising:
a state machine configured to scan the content for predetermined tags without generating a memory model of the content, wherein the state machine is configured to:
scan the content by transitioning a state of the state machine from an initial state to a current state based on a character-by-character evaluation of the content to be transmitted to a requesting client until reaching a state indicating that one of the predetermined tags has been encountered, when encountering a character indicating a beginning of one of the predetermined tag, buffering content being transmitted in response to the request until determining whether one of the tags has been encountered, upon reaching a state indicating that one of the predetermined tags has been encountered, dynamically inserting a token into the content as the content is transmitted to the requesting client, and when encountering a character indicating a malformed portion of the content transitioning to a safe state until encountering a well-formed portion of the page of content;

one or more tokens configured for insertion in the set of content in association with the predetermined tags; and logic configured to search a received request for a token inserted in the set of content.

12. The apparatus of claim 11, further comprising:
a repository of content servable by the apparatus.

13. The apparatus of claim 11, further comprising:
token generation logic configured to generate the one or more tokens.

14. The apparatus of claim 13, wherein a first token is configured prior to the scanning of the set of content by said state machine.

15. The apparatus of claim 13, wherein a first token is a predetermined token for insertion into multiple sets of content.

16. The apparatus of claim 13, wherein the token generation logic generates a first dynamic token by:
receiving from the state machine a subset of the scanned content; and
generating the first dynamic token as a function of the subset of the scanned content.

17. The apparatus of claim 16, wherein the subset of the scanned content comprises one or more tags.

18. The apparatus of claim 11, further comprising:
application logic configured to serve the set of content in response to a first request for the content.

19. The apparatus of claim 11, wherein said state machine is configured to forward the set of content to a destination while scanning the content.

20. The apparatus of claim 11, wherein said state machine is configured to scan the set of content while the set of content is served.

\* \* \* \* \*